M. A. WAGNER.
AUTOMOBILE EMERGENCY BRAKE.
APPLICATION FILED JULY 9, 1909.
952,851.
Patented Mar. 22, 1910.
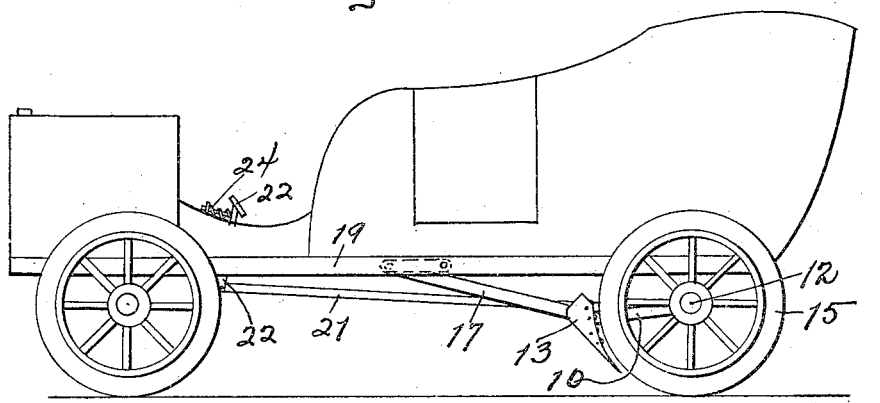
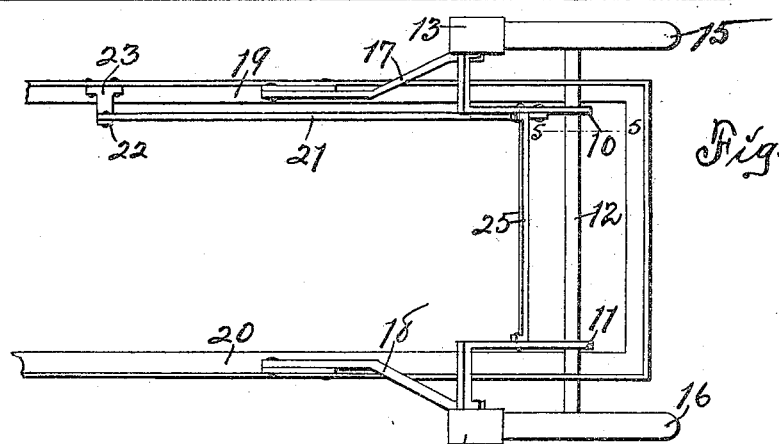
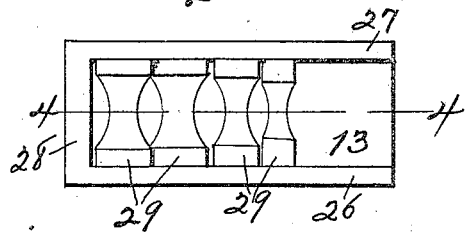
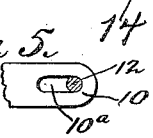
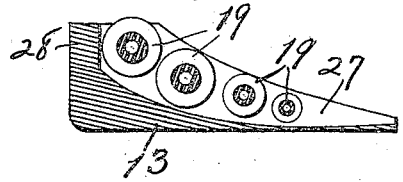
Attest:
L. L. Leibrock.
Earl M. Sinclair.
Inventor:
Marion A. Wagner,
By J. Ledwech Atty

UNITED STATES PATENT OFFICE.

MARION A. WAGNER, OF DES MOINES, IOWA, ASSIGNOR OF ONE-FOURTH TO VICTOR CARLSON, OF DES MOINES, IOWA.

AUTOMOBILE EMERGENCY-BRAKE.

952,851.  Specification of Letters Patent.  Patented Mar. 22, 1910.

Application filed July 9, 1909. Serial No. 507,252.

*To all whom it may concern:*

Be it known that I, MARION A. WAGNER, a citizen of the United States of America, and resident of Des Moines, Polk county, Iowa, have invented a new and useful Automobile Emergency-Brake, of which the following is a specification.

The object of this invention is to provide an emergency brake for automobiles, motor carriages and the like.

A further object of this invention is to provide brake shoes adapted to be interposed between the driving wheels of an automobile and the ground and to carry said wheels while the shoes drag on the ground.

My invention consists in the construction, arrangement and combination of elements set forth, pointed out in my claim and illustrated by the accompanying drawing, in which—

Figure 1 is a side elevation showing my devices attached to an automobile. Fig. 2 is a bottom plan of the same. Fig. 3 is a plan of one of the brake shoes. Fig. 4 is a longitudinal section of the brake shoe on the indicated line 4—4 of Fig. 3. Fig. 5 is a cross-section of the driving axle showing the slotted construction of one of the arms pivoted thereto, on the indicated line 5—5 of Fig. 2.

In the construction of the device as shown, the numerals 10, 11 designate arms pivoted at their rear ends on the driving axle 12 of an automobile or motor vehicle. The driving axle 12 extends through longitudinal slots 10$^a$ (Fig. 5) in the rear end portions of the arms 10, 11. The forward end portions of the arms 10, 11 are bent outwardly and brake shoes 13, 14 are fixed to the extremities thereof and normally are carried thereby in front of traction wheels 15, 16 of the automobile. Jointed props 17, 18, or braces, are pivoted at their rear ends to the outer ends of the arms 10, 11. The forward ends of the jointed props 17, 18 are pivoted to side bars 19, 20 of the frame of the automobile. A rod 21 is pivoted at its rear end to the central portion of the arm 10 and said rod is pivoted at its forward end to the lower end of a lever 22, said lever being fulcrumed on a bearing 23 fixed to the bar 19 and extending within the body of the automobile. The lever 22 is yieldingly held in one direction by a spring 24 suitably mounted and impinging thereon. The lever 22 preferably is arranged for pedal actuation against the spring 24 and preferably is located in front of the driver's seat. It is the function of the spring 24 to hold the lever 22 in such position that said lever applies strain to the rod 21 to the end of lifting the arms 10, 11, shoes 13, 14 and jointed props 17, 18 into the position shown. The arms 10, 11 are connected for simultaneous movement by a bar 25. Each of the shoes 13, 14 is formed with side walls 26, 27 and a front end wall 28 and rollers or spools 29 are journaled in and between said side walls. The rollers or spools 29 are of graduated diameters and are formed with concaved peripheries and are arranged in a row on an arc corresponding in curvature to the tire or rim of either wheel 15, 16.

In practical use of the automobile the shoes 13, 14 are carried in inoperative positions substantially as shown. When it is desirable to effect an emergency stop, foot pressure is applied to the lever 22 to the end of overcoming the spring 24, permitting the shoes 13, 14 to descend, through arcs, beneath the wheels 15, 16. In the descent of the shoes 13, 14 the jointed props or braces 17, 18 straighten out and serve as draft rods to limit rearward movement of the shoes. When the shoes 13, 14 enter beneath the wheels 15, 16, the arms 10, 11 rise slightly across the axle 12, and said wheels ride upon the rollers or spools 29 and may revolve freely thereupon. It is the function of the shoes to suspend traction engagement of the wheels 15, 16 and substitute therefor sliding engagement of the shoes with the surface over which the automobile travels. Reverse movement of the wheels 15, 16 aided by resilience of the spring 24 will replace the shoes 13, 14 in their normal inoperative positions.

I claim as my invention—

An automobile emergency brake comprising, in combination with traction wheels, a driving axle supported therein and a frame carried by said driving axle, of arms adapted to embrace and be pivoted to and extend forwardly and downwardly from said axle, the forward ends of said arms extending laterally, shoes on the laterally extending portions of said arms and adapted to be moved with said arms through an arc to positions beneath said traction wheels, rollers in said shoes, a bar connecting said arms in advance of the axle, jointed props connecting the laterally extending portions of said arms to the frame in advance of the traction wheels, each jointed prop comprising a short member pivoted at one end to the frame and a longer member pivoted at one end to an arm, adjacent ends of the members pivoted together, a bearing mounted on the frame, a lever fulcrumed in said bearing, a spring adapted to press said lever in one direction and a rod pivoted at one end to the central portion of one of the arms and pivoted at its forward end to the lower end portion of said lever.

Signed by me at Des Moines, Iowa, this eighth day of February, 1909.

MARION A. WAGNER.

Witnesses:
W. W. FINK,
S. C. SWEET.